March 7, 1961

W. W. GRIMES ET AL 2,973,645

CATALYST SAMPLING

Filed June 30, 1958

INVENTORS
WILLIAM W. GRIMES
LESTER D. MILLS JR.
JAMES S. WISHART
BY
Oberlin & Limbach
ATTORNEYS

United States Patent Office 2,973,645
Patented Mar. 7, 1961

2,973,645
CATALYST SAMPLING

William W. Grimes, Lester D. Mills, Jr., and James S. Wishart, Cleveland, Ohio, assignors to The Standard Oil Company, Cleveland, Ohio, a corporation of Ohio Filed June 30, 1958, Ser. No. 745,339

6 Claims. (Cl. 73—424)

This invention relates to an improved sampling device for use in combination with a reaction vessel which will, in the operation thereof, contain a charge or bed of catalyst, and it is a primary object of the invention to provide means for obtaining samples of the catalyst during, and without interruption of, normal operation of the vessel.

Most, if not all, catalytic processes are continuous in nature or at least involve operation over fairly long periods of time, whereas the condition of the catalyst must or desirably should be analytically determined at relatively short intervals. For obvious reasons, it is highly desirable that the samples can be removed without having to stop or interfere with the operation for this purpose. However, in many cases it is difficult to obtain truly representative samples of the catalyst under actual operating conditions, particularly where the catalyst forms a fixed bed in the reaction vessel as, for example, in a well-known type of reforming reactor used in the production of high octane gasoline.

The problem is not simply physically to extract a sample of the catalyst, but to ensure that the sample does accurately reflect the general condition of the bed, this of course being the measure of efficiency of the sampler employed, and whether used in a quiescent period or during operation, more or less conventional sampling devices have various mechanical and operational characteristics which seriously impair the reliability of the samples removed by the same.

For example, an ordinary collector probe permanently installed in the reactor has been found to disturb significantly the normal vapor flow patterns in the bed, whereby the catalyst in the immediate vinicinty of the probe is not representative of the general catalyst condition. The known retriever-type of sampler which is inserted in and withdrawn from the charge when the sample is required is likewise unreliable, since its mechanical action results in local crushing or breaking of the catalyst and subsequent samples therefore contain excessive fines. In this case, the subsequent sample would not be accurately representative since the fines would not necessarily promote reactions similarly as the catalyst of normal size distribution.

Avoidance of such limitations, whereby accurate sampling is provided, is accordingly a further object of our invention. Another object is to provide a sampler for obtaining a representative sample from the interior of a catalyst bed, rather than at the periphery of the same, while still avoiding disturbance of the normal vapor flow.

It is also an object of the invention to provide a catalyst sampler of such construction and arrangement as to protect the various operative components used against possible mechanical interference by the catalyst in passage of the same through the assembly.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 3 is a transverse section taken approximately on the line 3—3 in Fig. 2;

Fig. 4 is another transverse section as viewed from the plane indicated by the line 4—4 in Fig. 2; and Fig. 5 is a further section taken approximately on the line 5—5 in Fig. 2.

Figure 1:
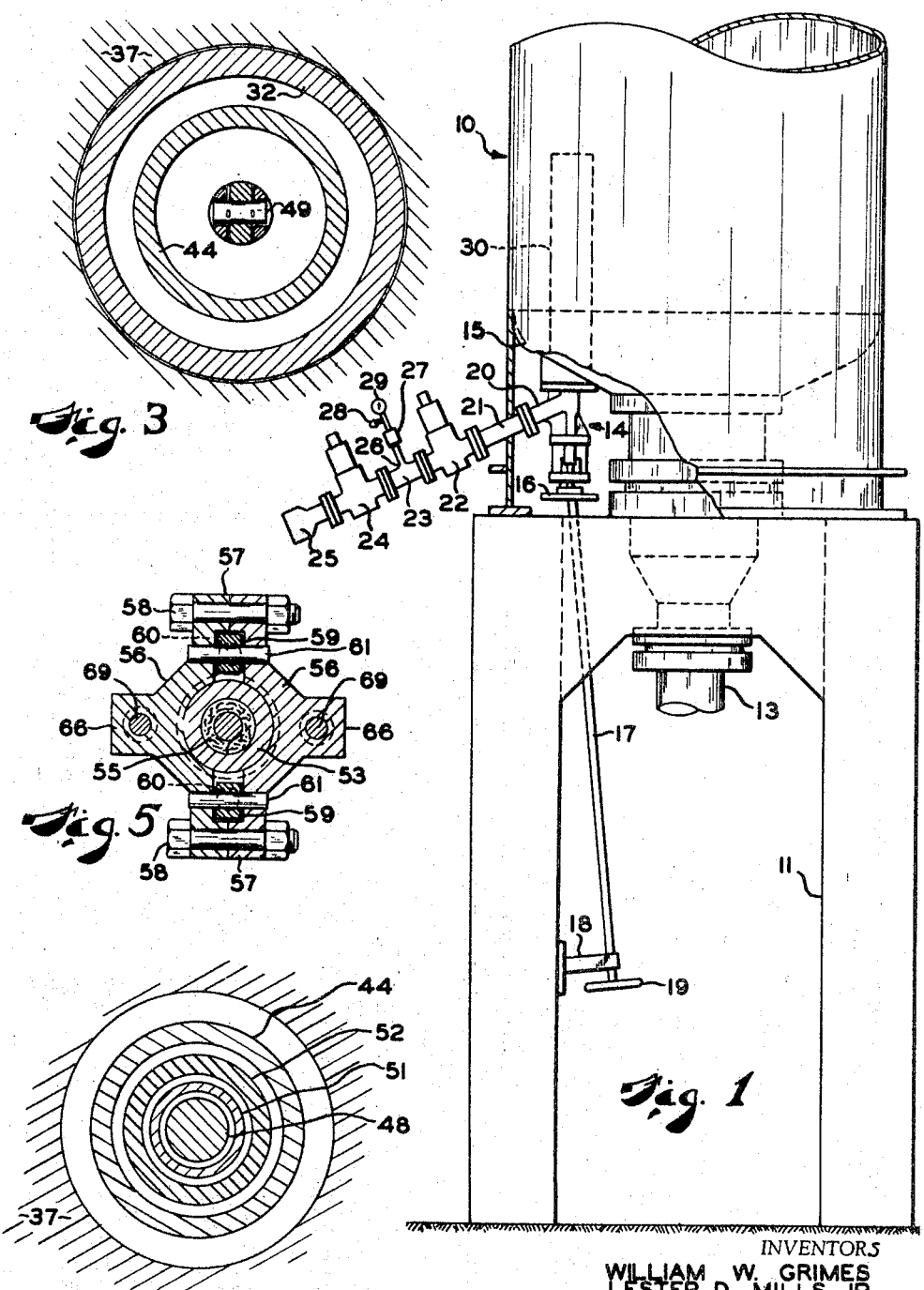
Fig. 1 is an elevation of a reactor, shown fragmented for convenience, equipped with a sampling device in accordance with our invention.

Referring now to the drawings in detail, reference numeral 10 designates generally a reactor of conventional type supported on and extending above a concrete foundation 11. The details of the reactor do not form a part of the present invention, but it will be understood from the foregoing that the same is intended to contain a bed of particulate catalyst and it may be helpful to note that we have been particularly concerned with obtaining samples from a fixed-bed gasoline reforming reactor.

Figure 2:
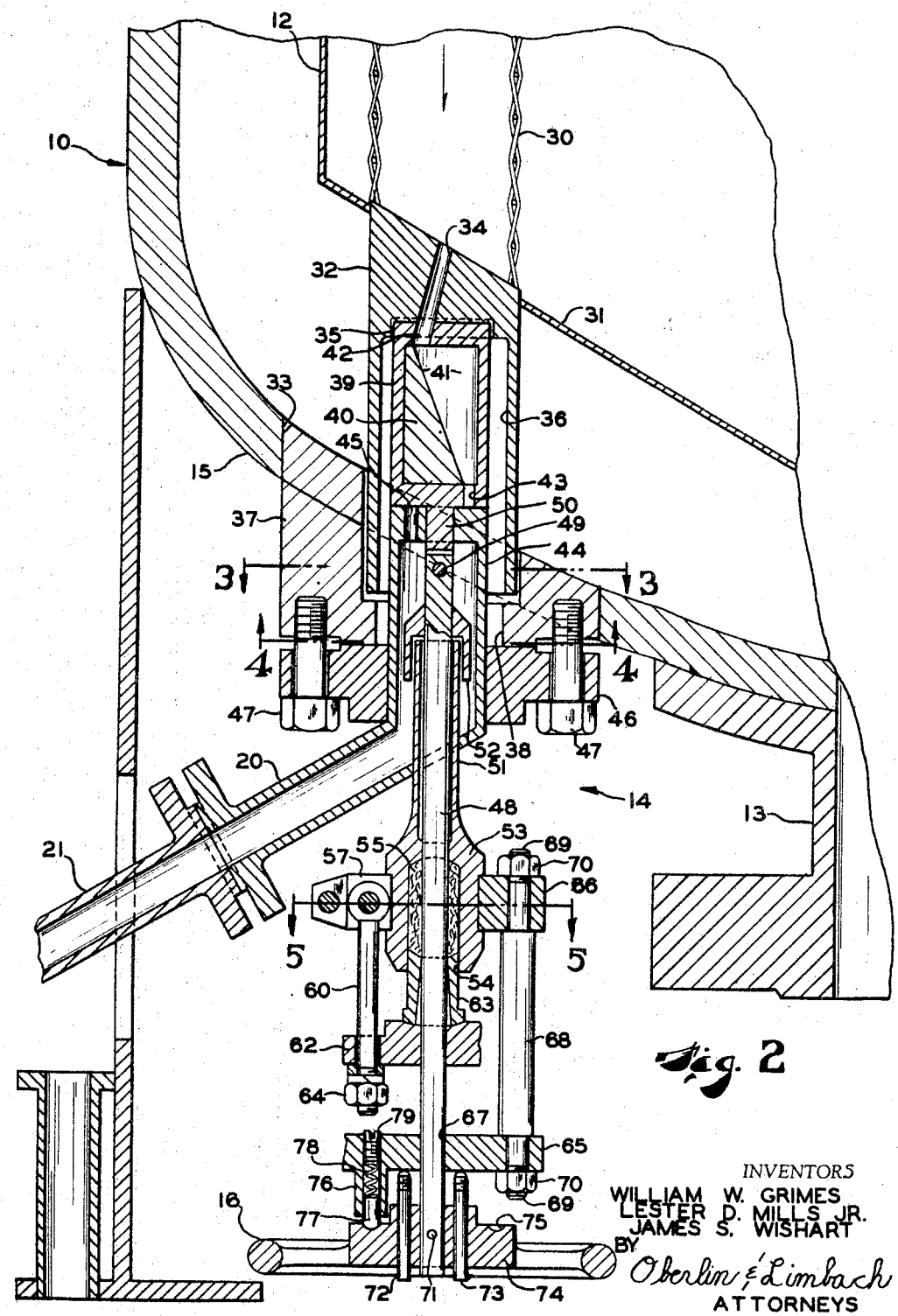
Fig. 2 is a longitudinal section of the major assembly of such device on an enlarged scale.

This reforming reactor is of course completely closed, with an inwardly spaced liner indicated at 12 in Fig. 2 and a central bottom outlet 13 being provided, and, as will be understood by workers in the art, the catalyst in such case will be in the form of platinum-bearing pellets or particles. The space between the outer wall and the liner is filled with concrete, not shown, and the vapor flow can either be radially inward from the periphery of the reactor to a central collector pipe or downwardly through the catalyst bed, depending upon the particular type of discharge being used.

As illustrated, our new sampling device is located at the bottom of the reactor and is shown in Fig. 1 as comprising a vertical main assembly designated generally by reference numeral 14 secured to the bottom head 15 of the reactor and having a hand wheel 16 for actuating the same in a manner which will be described hereinafter. This unit is located between the reactor and the top of the concrete foundation, and since the latter may be of considerable height, we have shown an extension shaft 17 connected to the immediate hand wheel 16 and extending downwardly through a suitable support 18 on the lower portion of the foundation to another wheel 19 which can conveniently be actuated by a workman at the ground level.

Leading from the main assembly 14 of the sampler, there is a downwardly and outwardly extending branch 20 adapted to pass the sample of the catalyst withdrawn from the reactor. A first pipe section 21 is connected to such branch and leads to one side of a valve 22. A second pipe section 23 extends from the other side of this valve 22 to a further valve 24, and a container 25 for receiving the catalyst sample is removably secured at the opposite or outlet side of such further valve. The pipe section 23 between the two valves is provided with an intermediate outlet 26 to which a depressurizing line is connected, this line being shown, somewhat schematically, as comprising a catalyst and dust filter 27, a discharge nozzle 28, and a pressure gauge 29, all of suitable standard construction.

Some form of isolating and depressurizing means obviously must be used where the atmosphere in the reactor is at appreciably elevated pressure, which is the usual case, and it will be seen that opening our first valve 22 and closing the second 24 permits a catalyst sample at high pressure to pass to the intermediate pipe section 23. Closing the valve 22 now isolates the sample and the pressure can be relieved by actuating the nozzle 28, the gauge 29 indicating the reduction in pressure. The second valve 24 is then opened to permit the depressurized sample to pass to the removable container 25.

The manner in which the sample is actually removed from the reactor will now be described with particular reference to Fig. 2. A cylindrical screen 30 is positioned in the reactor to extend vertically from the bottom 31 of the liner, in spaced relation to the liner side wall, and thus into the bed of catalyst when the reactor is charged with such material. This screen is preferably made of wire mesh, shown incompletely in the drawing for convenience of illustration, and is fully open at its upper end. Regardless of whether a wire mesh or other similarly porous material, for example, a perforated tube, is used, the conduit thus provided is of sufficient porosity to avoid significant vapor deflection, whereby vapor can flow freely through the same in operation of the reactor.

The lower end of the screen or perforate conduit 30 is supported by the upper end of a chambered cylindrical member 32 secured at such end in an opening in the bottom of the liner and extending downwardly to a further aligned opening 33 provided in the bottom head 15 of the reactor. The otherwise solid upper end portion of the member 32 is formed with a passage 34 extending from the center of the top end face downwardly at an angle to the axis to the upper, reduced end portion 35 of a fairly large chamber 36 open at the bottom of the member. The opening 33 in the bottom head of the reactor is considerably larger than the diameter of the inwardly projecting member 32 and a support housing 37 is secured in such opening about the projecting lower end of the member, such support having a center aperture 38 in registry with the chamber 36 of the inner member.

A specially constructed rotor 39, serving as a valve, is positioned within the chamber 36 with its upper end received in the reduced end portion 35 of the same and the adjacent end faces of the two in contact. This rotor is hollow and has a tapered insert 40 fixed therein which defines an inner flow chamber 41 of greater area at the top than at the bottom. An inclined top orifice 42 and a bottom orifice 43 parallel to and outwardly of the axis provide communication with the inner chamber 41 at the ends of the rotor, with the upper orifice 42 being located for movement upon rotation into registry with the passage 34 leading from the interior of the screen 30. This is the condition illustrated in Fig. 2 and it will be understood that turning of the rotor will move such top orifice out of registry with the passage and thereby isolate the inner flow chamber while sealing the passage.

The lower end of the rotor contacts the upper end of a vertical continuation 44 of the angular branch pipe 20, such end being closed and provided with a port 45 for registry with the bottom orifice 43 of the rotor upon appropriate turning of the latter. The arrangement is such that when the top rotor orifice communicates with the passage from the screen area, the bottom orifice is positioned away from the branch port 45 and closed by an overlying imperforate portion of the branch end. When the rotor is turned to bring the bottom orifice into registry with the branch port, the top orifice is closed by being moved away from the passage 34.

The vertical extension 44 of the branch 20 is held in the described position by means of a collar 46 fastened by screws 47 against the bottom face of the support housing 37. Turning of the rotor 39 is accomplished by means of a manual drive shaft 48 having a yoke and pin connection 49 at one end to an axial extension 50 of the rotor which is of reduced size and projects through the upper end of the branch pipe 20, the connection of the same to the shaft being within the extension 44 and the shaft extending vertically through the wall of the pipe where the latter is turned outwardly. The shaft 48 passes through a stuffing box housing 51 extending into the branch pipe substantially to the upper end of the shaft and being welded to the pipe where it passes through the same. The shaft of course rotates within the housing 51, the upper end of the latter within the pipe being open, and a deflector 52 is fixed on the shaft to prevent the catalyst from entering between the shaft and the housing. Such deflector has an upper conical surface and a lower skirt embracing, in outwardly spaced relation, the end portion of the housing.

The external, main portion 53 of the stuffing box housing has a recess 54 about the shaft in which suitable packing material 55 is placed. The outer periphery of this portion of the housing is provided with a groove and seated therein are two half-ring sections 56 which, as best shown in Fig. 5, together form a collar completely encircling the body. The thus completed collar has four equally spaced peripheral lugs to which various connections are made and it will be seen from Fig. 5 that the diametrically opposite lug formations and connections are the same with one such pair, however, being different from the other. In order to show clearly the complete structure in the longitudinal section of Fig. 2, one lug has, in effect, been rotated 90° in this figure, so that one side of each lug pair appears.

Considering the unit in the orientation shown in Fig. 5, the top and bottom lugs 57 are formed by abutted end portions of the half-ring sections 56 and these are held tightly together by bolts 58. Such end portions are moreover recessed at their opposed faces to provide apertures 59 in which eyelet ends of hold-down bolts 60 are received and pivotally secured by means of pins 61 traversing the apertures. As shown in Fig. 2 each bolt 60 extends through an end opening in bar 62 slidably mounted on the shaft 48 and bearing against a plunger 63 likewise slidable on the shaft, such plunger projecting into the recess 54 of the stuffing box housing and having a concavely shaped inner end. Behind or below the bar 62 a nut 64 is threaded on each bolt 60, and it will be apparent that tightening of the two such nuts forces the plunger upwardly to compress the packing material 55, some degree of flexibility being provided for such adjustment by the pivotal connections of the bolts.

A bridge 65 is secured to the other pair of lugs 66, such bridge having a central aperture 67 through which the shaft 48 extends and being connected to lugs 66 by end bolts 68. Such bolts have reduced and threaded ends 69 respectively passing through the bridge and these lugs, and nuts 70 threaded externally on the bolt ends clamp the bridge and lugs firmly against the shoulders at top and bottom of the bolts.

The hand wheel 16 is fixed by a pin 71 to the lower end of the shaft 48, below the bridge 65 and two balancing set screws 72 and 73 are threaded through the hub 74 of the wheel, at opposite sides of the axis, into contact with the bottom face of the bridge. A circumferential groove 75 of approximately 180° extent is provided in the rear or upper face of the hub and a correspondingly axially off-set projection 76 of the bridge carries an index finger 77 which rides in such groove. This finger is slidable in a hole through the projection 76 and urged into contact with the wheel hub 74 by means of a spring 78 backed by a set screw 79. The groove 75 is so located that the index finger 77 will be at one end thereof when the wheel has been turned to move the rotor top orifice 42 into registry with the inlet passage 34 and at the other end of the groove when the rotor is turned to move the bottom orifice 43 into registry with the branch port 45. The groove and spring-loaded index finger thus cooperably indicate the condition of adjustment of the sampler.

When a sample of the catalyst is now to be withdrawn, the hand wheel is moved, either directly or by means of the optional extension shaft, to place the rotor 39 in the position illustrated in Fig. 2. Catalyst particles will then flow from the interior of the screen 30 through the passage 34 and aligned orifice 42 to the chamber 41 within the rotor and fill the latter, the volume of such chamber obviously being selected to provide the amount of catalyst desired for the sample. After a time interval determined to be adequate to withdraw the desired measured quanity of the catalyst, the wheel 16 is turned to its other indexed position, closing the top passage 34 and bringing the bottom orifice 43 into alignment with the port 45 leading to the branch pipe. The sample thus passes into the pipe 20 and to the connected system which terminates in the container 25, in the manner described earlier.

It will thus be seen that our sampler is located at all times outside of the catalyst bed and yet provides a truly representative sample, the catalyst within the screen being exposed to the normal vapor flow as a result of the porosity of the same. The deflector which protects the emergence of the drive shaft from the stuffing box housing is of course of such size as not to impede the flow of the catalyst and, if desired, packing material can be added in the space between the shaft and this end of the housing to ensure against the entrance of fine "dust" particles.

Another particular change which has been contemplated is the use of a rotor having a bellows-type wall, whereby this component would be more flexible, with the port arrangement being the same as described in the above.

Other modes of applying the principle of the invention may be employed, change being made as regards the details described, provided the features stated in any of the following claims or the equivalent of such be employed.

We, therefore, particularly point out and distinctly claim as our invention:

1. In combination with a vessel adapted to contain a charge of catalyst and the like, a sampling device comprising a foraminous conduit open at the top and projecting upwardly from the vessel portion which forms the bottom of the charge-receiving space, means defining a passage extending through that portion of such bottom bounded by said foraminous conduit, a hollow rotor having a top orifice which is placed in registry with the lower external end of such passage in one position of rotative adjustment of the rotor, whereby a sample of the charge can flow from within the foraminous conduit to the interior of the rotor, an outlet conduit below the rotor, the latter further having a bottom orifice and said outlet conduit being provided with a port for registry with such bottom orifice in another adjusted position of the rotor in which the top orifice is out of registry with the upper passage, so that the sample collected in the rotor in said one position is passed to the outlet by turning of the rotor to the other such position, and external actuator means for thus adjusting the rotor between the two such positions.

2. The combination set forth in claim 1 wherein said outlet conduit has a generally vertical upper end portion and a downwardly inclined lateral continuation thereof.

3. The combination set forth in claim 2 wherein said actuator means includes a shaft connected to the lower end of the rotor and extending vertically through the upper end portion of the outlet conduit and the wall of the latter at such lateral continuation of the same.

4. The combination set forth in claim 3 wherein the shaft projects through a sleeve-like member fixed in the outlet conduit wall, and a deflector is secured to the shaft where the same emerges from the inner end of said member to shield such end from the sample flow through the outlet conduit.

5. In combination with a vessel adapted to contain a charge of catalyst and the like, a sampling device comprising a foraminous conduit open at the top and projecting upwardly from the vessel portion which forms the bottom of the charge-receiving space, means defining a passage extending through that portion of such bottom bounded by said foraminous conduit, flow-confining means having an inlet for the sample and extending in a general downward direction therefrom, an adjustable collector for the sample movable between first and second positions wherein the same is respectively in communication with the lower external end of such passage and with the inlet of said flow-confining means, whereby said collector receives a measured quantity of the charge through such passage in the first position and passes such sample to the flow-confining means when moved to the second position, and a container for the thus withdrawn sample at the end of flow-confining means.

6. The combination set forth in claim 5 wherein said flow-confining means comprises a pair of spaced valves independently operative to open and close the same, and the section thereof between said valves is provided with vent means.

References Cited in the file of this patent

UNITED STATES PATENTS

| 1,825,200 | Patterson | Sept. 29, 1931 |
| 2,505,916 | Salvesen | May 2, 1950 |

FOREIGN PATENTS

| 425,930 | Great Britain | Mar. 25, 1935 |